US008897293B1

(12) United States Patent
Chowdhuri et al.

(10) Patent No.: US 8,897,293 B1
(45) Date of Patent: Nov. 25, 2014

(54) MAC PROCESSOR ARCHITECTURE

(75) Inventors: Bhaskar Chowdhuri, San Jose, CA (US); Srikanth Shubhakoti, San Diego, CA (US); Vinod Ananth, San Diego, CA (US); Hongyu Xie, San Diego, CA (US); Shui Cheong Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 125 days.

(21) Appl. No.: 13/465,907

(22) Filed: May 7, 2012

Related U.S. Application Data

(62) Division of application No. 12/334,218, filed on Dec. 12, 2008, now Pat. No. 8,175,015.

(60) Provisional application No. 61/018,585, filed on Jan. 2, 2008.

(51) Int. Cl.
*H04Q 11/00* (2006.01)

(52) U.S. Cl.
USPC ........... 370/378; 370/300; 370/381; 370/412; 370/428; 370/429; 712/1; 712/10; 712/19

(58) Field of Classification Search
USPC ................. 370/378, 300, 381, 412, 428, 429; 712/1, 10, 19, 52
See application file for complete search history.

(56) References Cited

U.S. PATENT DOCUMENTS 6,442,669 B2 *  8/2002  Wright et al. .................... 712/19
7,089,486 B1     8/2006  Marleux et al.
7,925,021 B2 *  4/2011  Un et al. ....................... 380/264
8,175,015 B1     5/2012  Chowdhuri et al.
2008/0072115 A1  3/2008  Cho et al.

OTHER PUBLICATIONS

IEEE Std 802.16a-2004 (Revision of IEEE Std 802.16/2001) "IEEE Standard for Local and metropolitan area networks: Part 16: Air Interface for Fixed Broadband Wireless Access Systems" The Institute of Electrical and Electronics Engineers, Inc., Oct. 1, 2004.
IEEE Std 802.16a-2003 (Amendment to IEEE Std 802.16/2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," The Institute of Electrical and Electronics Engineers, Inc., Apr. 1, 2003.

(Continued)

Primary Examiner — Un C Cho
Assistant Examiner — Siming Liu

(57) ABSTRACT

In a media access control (MAC) processor, a programmable controller is configured to execute machine readable instructions for implementing MAC functions corresponding to data received by a communication device. A tightly coupled memory is associated with the programmable controller. A system memory is coupled to the programmable controller via a system bus, and a hardware processor is coupled to the system bus and the tightly coupled memory. The hardware processor is configured to implement MAC functions on data received in a communication frame, store, in the tightly coupled memory, processed data corresponding to data in the communication frame that indicates a structure of downlink data in the communication frame, and store, in the system memory, processed data corresponding to other data in the communication frame.

16 Claims, 10 Drawing Sheets

(56) References Cited

OTHER PUBLICATIONS

IEEE Std 802.16e-2005 and IEEE Std 802.16/2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

* cited by examiner

MAC PROCESSOR ARCHITECTURE

CROSS-REFERENCE TO RELATED APPLICATION

The present application is a divisional application of U.S. application Ser. No. 12/334,218, entitled "WIMAX MAC," filed on Dec. 12, 2008, now U.S. Pat. No. 8,175,015, which claims the benefit of U.S. Provisional Application No. 61/018,585, entitled "WIMAX MAC," filed on Jan. 2, 2008. Both of the above-referenced applications are hereby incorporated by reference herein in their entireties.

FIELD OF THE DISCLOSURE

The present disclosure relates generally to communication systems, and more particularly, to techniques for implementing media access control (MAC) functions.

BACKGROUND

Communication systems such as the systems promulgated by the Worldwide Interoperability for Microwave Access (WiMAX) Forum (such systems conform to the Institute for Electrical and Electronics Engineers (IEEE) 802.16e Standard) typically include a plurality of base stations and a plurality of remote stations that communicate with one or more of the base stations by transmitting and receiving data. The time and frequency resources used in such communication systems are often partitioned into a series (in time) of frames, each frame being further partitioned according to both time and frequency. For example, the IEEE 802.16e Standard utilizes orthogonal frequency division multiple access (OFDMA) multiplexing, and each frame comprises a plurality of orthogonal frequency division multiplexing (OFDM) symbols which thus partition the frame by time. Additionally, each OFDM symbol comprises a plurality of subcarriers, thus also partitioning the frame by frequency.

In OFDMA, a particular data transmission (referred to as a "burst" in the IEEE 802.16e Standard) may be carried on a subset of OFDM symbols in a frame, and thus a subcarrier may carry data from different bursts from OFDM symbol to OFDM symbol. Similarly, a burst may be carried on a subset of subcarriers in each OFDM symbol, and thus each OFDM symbol may include data from a plurality of different bursts. With such a multiplexing scheme, media access control (MAC) systems tend to be complex and expensive to implement.

SUMMARY OF THE DISCLOSURE

In an embodiment, a media access control (MAC) processor comprises a programmable controller configured to execute machine readable instructions for implementing MAC functions corresponding to data received by a communication device, and a tightly coupled memory associated with the programmable controller. The MAC processor also comprises a system memory coupled to the programmable controller via a system bus, and a hardware processor coupled to the system bus and the tightly coupled memory. The hardware processor is configured to implement MAC functions on data received in a communication frame, store, in the tightly coupled memory, processed data corresponding to data in the communication frame that indicates a structure of downlink data in the communication frame, and store, in the system memory, processed data corresponding to other data in the communication frame.

In another embodiment, a method includes processing, with a hardware processor, data in a communication frame received by a communication device. Additionally, the method includes determining, with the hardware processor, that a first subset of data in the communication frame corresponds to data that indicates a structure of downlink data in the communication frame. The method further includes directly storing, in a tightly coupled memory of a programmable controller, the data that indicates the structure of downlink data in the communication frame, and storing, in a system memory coupled to the programmable controller via a system bus, other data in the communication frame.

DETAILED DESCRIPTION

Figure 1:
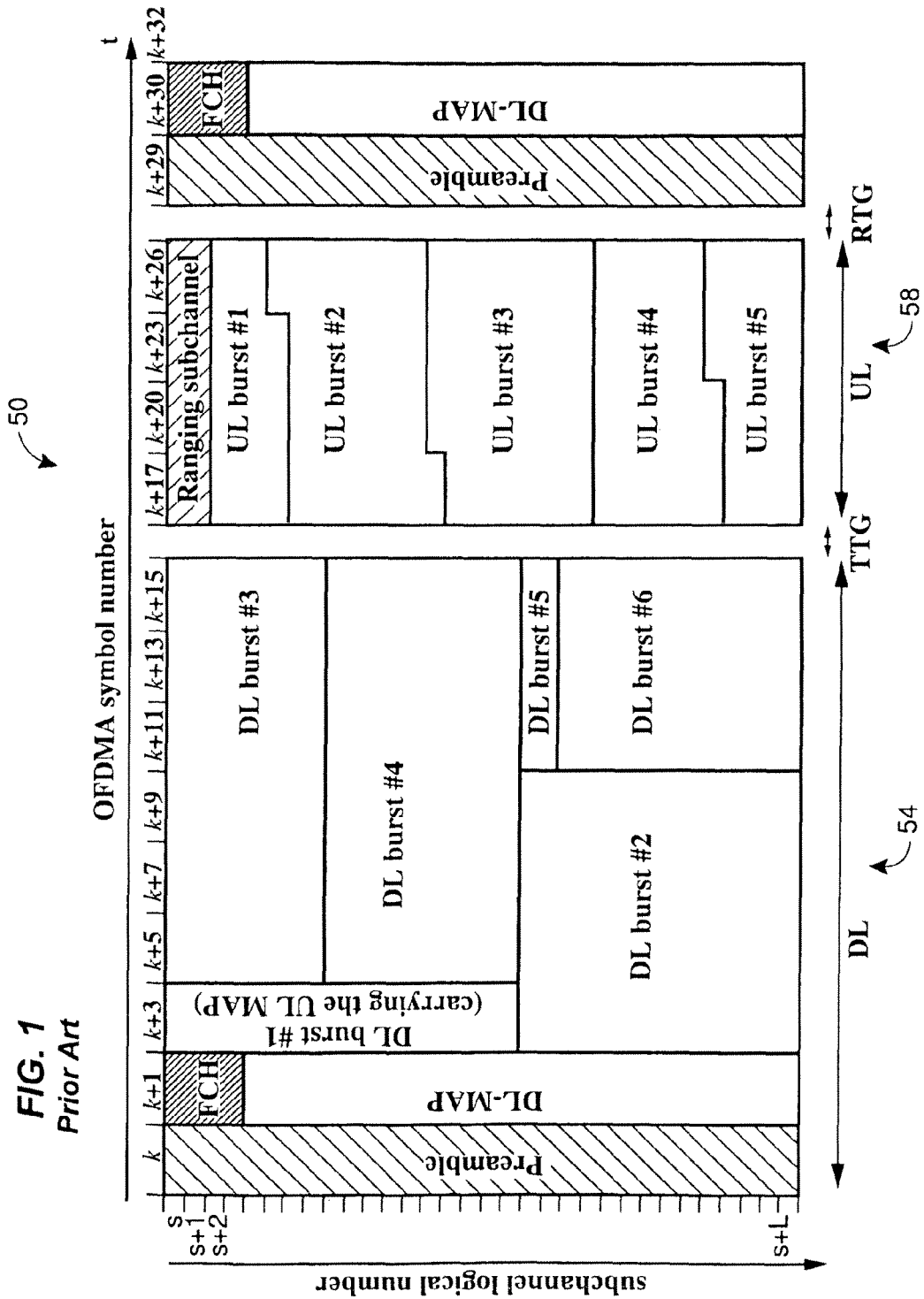
FIG. 1 is a diagram illustrating an example time division duplex (TDD) frame 50 in a WiMAX communication system.

FIG. 1 is a diagram illustrating an example time division duplex (TDD) frame 50 in a WiMAX communication system. The TDD frame 50 is specified in *IEEE Standard for Local and Metropolitan Area Networks; Part* 16: *Air Interface for Fixed and Mobile Broadband Wireless Access Systems; Amendment* 2: *Physical and Medium Access Control Layers for Combined Fixed and Mobile Operation in Licensed Bands and Corrigendum* 1, IEEE Standard 802.16e-2005 and 802.16-2004/Cor1-2005 (February 2006) (hereinafter "IEEE Standard 802.16e-2005"). In FIG. 1, the horizontal axis generally corresponds to time, whereas the vertical axis corresponds to logical subchannels. The TDD frame 50 includes a downlink (DL) subframe 54 and an uplink (UL) subframe 58. The DL subframe 54 may include a plurality of DL bursts (e.g., DL burst #1, DL burst #2, etc.), and the UL subframe 58 may include a plurality of UL bursts (e.g., UL burst #1, UL burst #2, etc.). The structure of the DL bursts and UL bursts within a TDD frame can change from frame to frame. Thus, each TDD frame includes information that generally indicates one or more of the position, size, and shape of DL and UL bursts within the TDD frame. For example, the TDD frame 50 includes a downlink map (DL-MAP) that specifies the structure of DL bursts within the DL subframe 54, and includes an uplink map (UL-MAP) that specifies the structure of UL bursts within the UL subframe 58.

The DL subframe 54 corresponds to transmissions from a base station to one or more subscriber stations. For example, different DL bursts may be destined for different subscriber stations. Additionally or alternatively, different DL bursts may correspond to different transmissions to one subscriber station. Similarly, the UL subframe 58 corresponds to transmissions from one or more subscriber stations to the base station. For example, different UL bursts may be transmitted by different subscriber stations. Additionally or alternatively, different UL bursts may correspond to different transmissions from one subscriber station.

Each burst can have a corresponding modulation and coding scheme that may be different than the modulation/coding schemes of other bursts. Indicators of the modulation/coding schemes utilized by the various bursts in the TDD frame 50 are included in the DL-MAP and the UL-MAP.

The IEEE 802.16 Standard (which includes the IEEE 802.16e Standard) also specifies frequency division duplex (FDD) frame structures in which two separate frames are utilized: a DL frame and a UL frame. Similar to FIG. 1, each FDD DL and FDD UL frame comprises a plurality of bursts, and the structure of each DL and UL frame can change from frame to frame. As with TDD, each burst in an FDD frame can have a corresponding modulation and coding scheme that may be different than the modulation/coding schemes of other bursts. Indicators of the modulation/coding schemes utilized by the various bursts in the FDD frames are included in a DL-MAP and a UL-MAP in the FDD DL frame.

Media access control (MAC) layer functionality in a communication device generally provides an interface between a physical layer and higher communication protocol layers such as ATM, TDM Voice, Ethernet, IP, unknown future protocols, etc. For data to be transmitted, the MAC layer takes data units from an upper layer and organizes them into data units corresponding to the MAC layer, and then provides these data units to the physical layer. In a WiMAX compliant device, for instance, the MAC layer takes packets from an upper layer (such packets referred to in the IEEE 802.16 Standard as "MAC service data units (MSDUs)") and organizes them into MAC protocol data units (MPDUs) for transmission via the physical layer. For received data, the MAC layer takes MAC data units and organizes them into data units for the upper layer and then provides these data units to the upper layer. In a WiMAX compliant device, for instance, the MAC layer takes MPDUs received via the physical layer and organizes them into MSDUs.

The IEEE 802.16 Standard specifies that an MPDU may have a variable length. Multiple MPDUs of same or different lengths may be aggregated into a single burst to save on physical layer overhead. Similarly, multiple MSDUs from the same higher-layer service may be concatenated into a single MPDU to save MAC header overhead. Conversely, a large MSDU may be fragmented into smaller MPDUs and transmitted across multiple frames.

FIGS. 2A-2F are examples of various MPDU frames according to the IEEE 802.16 Standard. Each MPDU frame is prefixed with a generic MAC header (GMH) that includes a connection identifier (CID), a length of the frame, and bits to indicate the presence of cyclic redundancy check (CRC), subheaders, whether the payload is encrypted and if so, with which key, etc. The frame payload may be a transport or a management message. Besides MSDUs, a transport payload may contain bandwidth requests or retransmission requests. The type of transport payload is identified by the subheader that precedes the transport payload. Examples of subheaders are packing subheaders and fragmentation subheaders. WiMAX MAC also supports ARQ, which can be used to request the retransmission of unfragmented MSDUs and fragments of MSDUs. The maximum frame length is 2,047 bytes, which is represented by an eleven-bit field in the GMH.

Figure 2A:
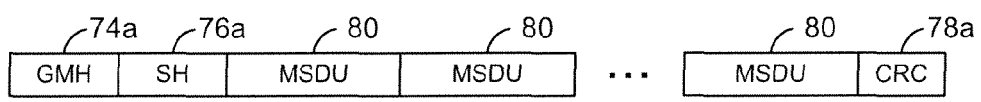
FIGS. 2A-2F are examples of various MAC protocol data unit (MPDU) frames according to the IEEE 802.16 Standard.

FIG. 2A is a diagram illustrating an example MPDU 72a that includes a GMH 74a, a subheader 76a, a CRC field 78a, and a plurality of fixed-length MSDUs 80. An MPDU such as the MPDU 72a is sometimes described as including a plurality of "packed" MSDUs.

Figure 2B:
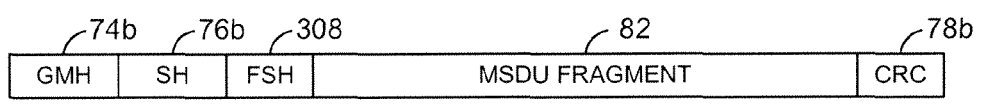

FIG. 2B is a diagram illustrating an example MPDU 72b that includes a GMH 74b, a subheader 76b, a CRC field 78b, and an MSDU fragment (i.e., a portion of full MSDU). Using MPDUs such as the MPDU 72b, an MSDU can be fragmented and transmitted via a plurality of MPDUs.

Figure 2C:
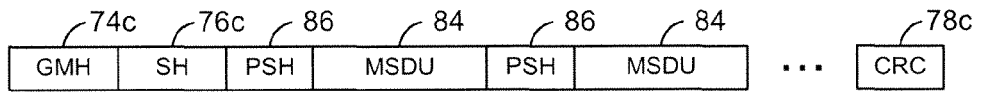

FIG. 2C is a diagram illustrating an example MPDU 72c that includes a GMH 74c, a subheader 76c, a CRC field 78c, and a plurality of variable-length MSDUs and/or MSDU fragments 84. Each variable-length MSDU and MSDU fragment has an associated packing subheader 86.

Figure 2D:
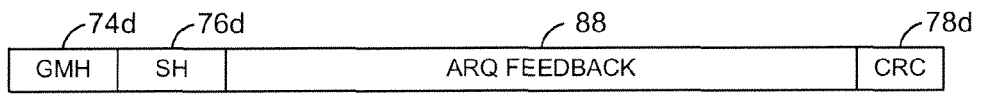

FIG. 2D is a diagram illustrating an example MPDU 72d that includes a GMH 74d, a subheader 76d, a CRC field 78d, and an automatic repeat request (ARQ) feedback message. The ARQ feedback message may indicate that a previously transmitted MPDU, MSDU, MSDU fragment, etc., was received, and whether it was received without errors.

Figure 2E:
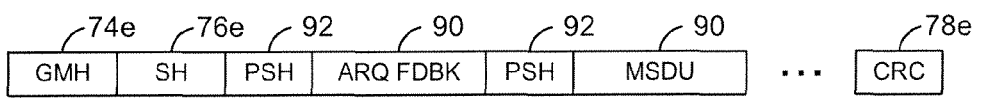

FIG. 2E is a diagram illustrating an example MPDU 72e that includes a GMH 74e, a subheader 76e, a CRC field 78e, a plurality of variable-length MSDUs, MSDU fragments, and/or ARQ feedback messages 90. Each variable-length MSDU, MSDU fragment, and ARQ feedback message has an associated packing subheader 92.

Figure 2F:
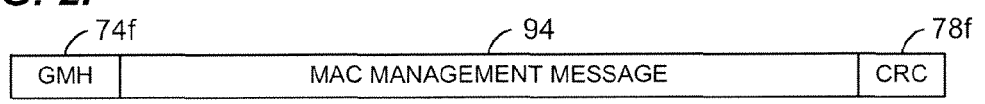

FIG. 2F is a diagram illustrating an example MPDU 72f that includes a GMH 74f, a CRC field 78f, and a MAC management message 94.

Referring again to FIG. 1, each burst in the frame 50 may include one or more MPDUs, such as the MPDUs illustrated in FIGS. 2A-2F.

Figure 3:
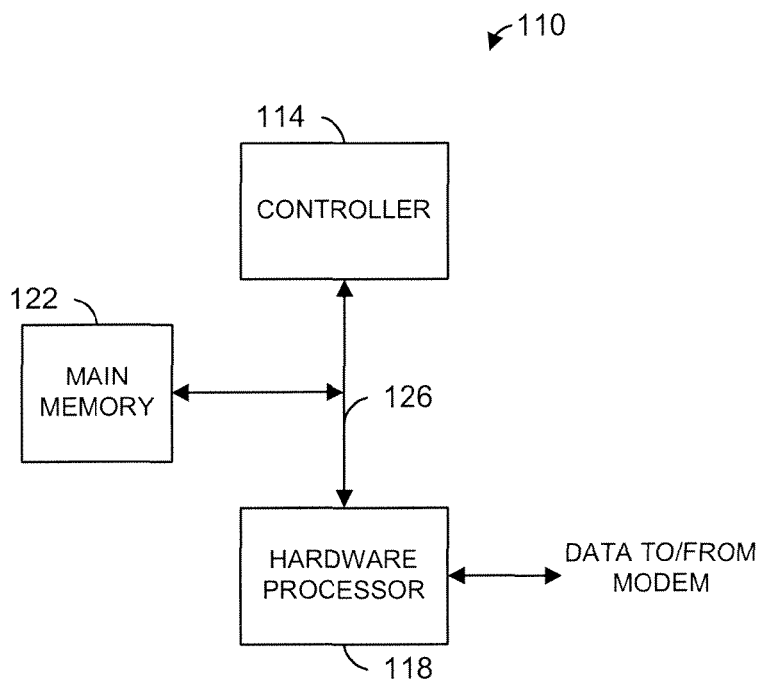
FIG. 3 is a block diagram of an example MAC processor that can implement MAC functionality in a communication device.

FIG. 3 is a block diagram of an example MAC processor 110 that can implement MAC functionality in a communication device, such as a device compliant with WiMAX. For ease of explanation, the example MAC processor 110 will be described in the context of WiMAX. It will be understood by those of ordinary skill in the art, however, that a MAC processor such as the example MAC processor 110 may be utilized in other contexts as well. The MAC processor 110 may be included in a subscriber station (SS), and, for ease of explanation, the MAC processor 110 will be described in the context of an SS. It will be understood by those of ordinary skill in the art, however, that the MAC processor 110 could also be included in other devices as well, such as a base station (BS).

The MAC processor 110 includes a programmable controller 114 communicatively coupled to a hardware processor 118. The programmable controller 114 and the hardware processor 118 may each be communicatively coupled to a main memory 122. In one embodiment, the programmable controller 114, the hardware processor 118, and the main memory 122 are coupled to a bus 126. Machine readable instructions to be executed by the programmable controller 114 may be stored in the main memory 122 and/or in another memory associated with the programmable controller 114. For example, the programmable controller 114 may include or be coupled to tightly coupled memory (TCM). Generally, the programmable controller 114 is able to access the TCM more quickly than, for example, the main memory 122. For example, the TCM may be part of a core of the programmable controller 114 and/or have faster access time characteristics as compared to the main memory 122. For example, the TCM may be similar to processor cache memory.

The MAC processor 110 may be implemented on a single integrated circuit or multiple integrated circuits. In one embodiment, the MAC processor 110 may be included in a system on a chip (SOC).

The MAC processor 110 generally acts as an interface between a modem that implements physical layer functions and higher communication protocol layers such as ATM, TDM Voice, Ethernet, IP, unknown future protocols, etc. The MAC processor 110 receives MSDUs from upper layer functions, organizes them into MPDUs, and then provides the MPDUs to the modem for transmission from the SS. Additionally, the MAC processor 110 receives MPDUs from the modem, the MPDUs having been received by the SS, extracts and forms MSDUs that were packaged in the MPDUs, and then provides the MSDUs to the upper layer protocol functions. Additionally, the MAC processor 110 performs other MAC functions. Further, as each DL-MAP and UL-MAP is received, the MAC processor 110 appropriately configures the modem so that the modem can demodulate/decode and modulate/encode as specified in the DL-MAP and the UL MAP.

In general, the hardware processor 118 generally receives from a modem data that was received by the SS. Additionally, the hardware processor 18 generally sends to the modem data that is to be transmitted by the SS. The hardware processor 18 performs MAC functions that require low latency such as forming MPDUs that are to be transmitted by the SS, unpacking MPDUs that were received by the SS, computing CRC fields, checking for errors based on CRC fields, etc. On the other hand, the programmable controller 114 generally performs MAC functions that do not require as low latency as those functions performed by the hardware processor 118, and/or performs MAC functions that require more complex logic. For example, the programmable controller 114 may process a MAP message to determine the burst structure, modulation/coding schemes, etc. of a WiMAX frame or sub-frame, and then configuration information to the hardware processor 18 and/or the modem to configure the hardware processor 18 and/or the modem to handle the WiMAX frame or sub-frame correctly.

Data may be transferred to and/or from one or more other processors that implement the upper protocol layers via the main memory 122, for example. Additionally or alternatively, data may be transferred to and/or from the one or more other processors that implement the upper protocol layers via communication links and/or memories/buffers separate from the main memory 122 and/or bus 126. In another embodiment, the programmable controller 114 may also implement functions of one or more upper layer protocols. In such an embodiment, data need not be transferred from the MAC processor 110 to implement functions of an upper layer protocol.

As described above, the programmable controller 114 may determine the burst structure of a WiMAX frame or sub-frame. Also, as described above, the shape of a burst (in dimensions of subchannels and OFDM symbols) may be fairly complex. In one embodiment, the programmable controller 114 is configured to represent a burst as one, two, or three rectangles, wherein the dimensions of the rectangles correspond to subchannels and OFDM symbols. Referring again to FIG. 1, each of the DL bursts can be represented by a single rectangle. On the other hand, UL burst #1 can be represented by two rectangles: a first rectangle from symbol numbers k+17 to k+25, and a second rectangle from symbol numbers k+26 to k+28, for example. Also, UL burst #2 can be represented by three rectangles: a first rectangle from symbol numbers k+17 to k+19, a second rectangle from symbol numbers k+20 to k+25, and a third rectangle from symbol numbers k+26 to k+28, for example. A rectangle corresponding to a burst, in turn, could be represented by a location and dimensions, for example. For instance, the location could be represented by the location of a corner of the rectangle, such as the upper-left-most corner of the rectangle (using the axis illustrated in FIG. 1). Additionally, the dimensions of the rectangle could be represented by a number of OFDM symbols or slots (a unit of time defined in the IEEE 802.16 Standard) and a number of subchannels, for example. Alternatively, the location and dimensions of the rectangle could be represented by starting and ending OFDM symbols or slots and starting and ending subcarriers, for example.

By representing each burst as one, two, or three rectangles, the structure of the WiMAX frame can be represented in a compact way. Additionally, this helps the MAC processor 110 to quickly provide the modem with burst specific modulation/demodulation and encode/decode information in a timely manner so that the modem can use it to modulate/demodulate and encode/decode data in the current frame as specified in the DL-MAP and the UL-MAP. In one embodiment, after the programmable controller 114 has defined the structure of the frames/sub-frames (or at least the DL frame or DL sub-frame) as discussed above, the processor 100 may provide demodulation/decoding information to the modem on an OFDM symbol-by-OFDM symbol or slot-by-slot basis so that the modem can appropriately demodulate/decode in each OFDM symbol or slot.

In one embodiment, the hardware processor 118 receives data corresponding to a burst from the modem and then processes the burst data. The data processed by the hardware processor 118 is then stored in the main memory 122. The programmable controller 114 then accesses the burst data in the main memory 122 to perform additional MAC functions. As discussed above, the programmable controller 114 is configured by and operates according to machine readable instructions stored in a memory.

Figure 4:
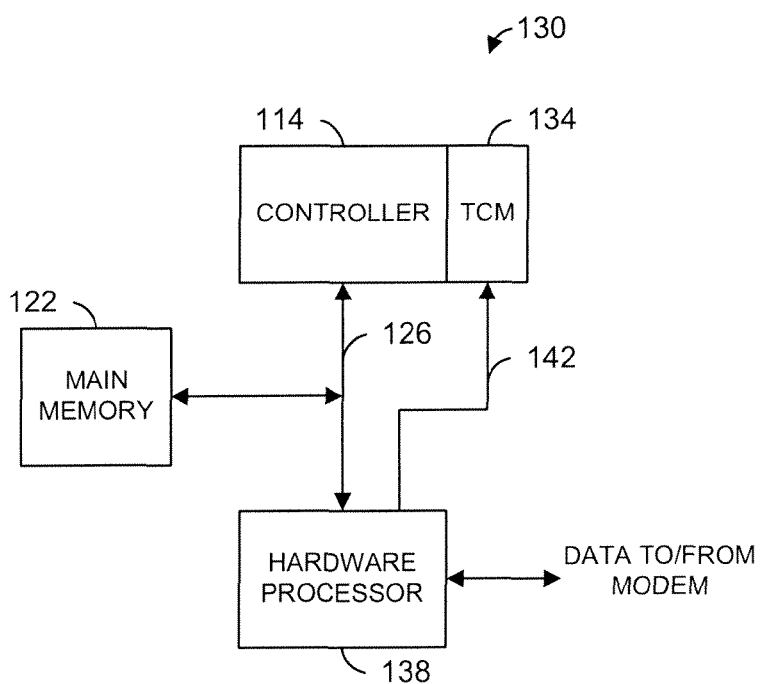
FIG. 4 is a block diagram of another example MAC processor.

FIG. 4 is a block diagram of another example MAC processor 130 that can implement MAC functionality in a communication device, such as a device compliant with WiMAX. The MAC processor 130 includes elements the same as the MAC processor 110, and such elements are like numbered. For ease of explanation, the example MAC processor 130 will be described in the context of WiMAX. It will be understood by those of ordinary skill in the art, however, that a MAC processor such as the example MAC processor 130 may be utilized in other contexts as well. The MAC processor 130 may be included in an SS, and, for ease of explanation, the MAC processor 130 will be described in the context of an SS. It will be understood by those of ordinary skill in the art, however, that the MAC processor 130 could also be included in other devices as well, such as a BS.

In the MAC processor 130, the controller 114 includes TCM 134. The TCM 134 may include instruction memory and/or data memory. Additionally, the hardware processor 138 is coupled to the TCM 134 via a communication link 142 separate from the bus 126. The hardware processor 138 is able to write to the TCM 134 via the communication link 142.

As discussed above, the DL-MAP and the UL-MAP occur at the beginning of a frame. The DL-MAP includes information that the SS needs to determine how the frame is structured, modulated, encoded, etc. In the example processor 130, the hardware processor 138 is configured to store certain data in the TCM 134, as opposed to storing such data in the main memory 122. For example, the hardware processor 138 is configured to store data corresponding to a first set of bursts in the TCM 134 and a data corresponding to a second set bursts in the main memory 122. For example, in the example frame 50 of FIG. 1, each of the DL-MAP and the UL-MAP may be considered as being within a burst. Thus, the hardware processor 138 is configured to store the DL-MAP and the DL burst #1 (or at least the UL-MAP portion of DL burst #1) in the TCM 134, and to store DL burst #2, DL burst #3, DL burst #4, DL burst #5, and DL burst #6 in the main memory 122.

The programmable controller 114 will tend to utilize more central processing unit (CPU) clock cycles accessing the main memory 122 as compared to the TCM 134. Thus, by storing time-critical information (such as the DL-MAP, a compressed DL-MAP (C-DLMAP), the UL-MAP, etc.) in the TCM 134 directly, as opposed to storing this information in the main memory 122 and having the programmable controller 114 access this information via the bus 126, the programmable controller 114 will be able to process such time-critical information more quickly.

As discussed above, the programmable controller 114 may determine the structure of a frame based on the DL-MAP, the UL-MAP, etc. In one embodiment, the programmable controller 114 may provide frame structure information to the hardware processor 118 or the hardware processor 138 and/or the modem in a format that can be easily accessed, interpreted, and/or processed by hardware. In one implementation, the programmable controller 114 may generate a first table for each sub-frame (for TDD) and store the first table in a memory, such as the main memory 122. The first table will include information about each burst such as the modulation used, the coding used, etc., which may be accessed or located using indications of the different bursts. The indicator of a burst may be referred to as a burst identifier (ID), and the information about the burst may be referred to as a burst descriptor. The burst ID may allow indexing into the first table to access a particular burst descriptor, for example. The number of bursts in a sub-frame may have a top limit B defined by the communication protocol that is being implemented. Thus, the number of bits of the burst IDs needed to uniquely identify each burst in a sub-frame therefore may be $\log_2 B$. In another implementation, B may be the number of bursts in a sub-frame, and the number of bits in the burst IDs may change from frame to frame.

Thus, the programmable controller 114 may assign corresponding unique burst IDs (having a length $\log_2 B$, for example) to the different burst in each sub-frame. Additionally, the programmable controller 114 may generate the first table that includes the burst IDs and the corresponding burst descriptors. Each burst descriptor is associated in the first table with the corresponding burst ID so that the hardware processor 118 or the hardware processor 138 and/or the modem can retrieve the burst descriptor for a particular using knowledge of the burst ID for that particular burst.

Referring again to FIG. 1, a WiMAX frame such as the example frame 50 is two dimensional in terms of time and frequency. For example, in FIG. 1, the horizontal axis corresponds to time (or OFDM symbols or slots) and the vertical axis corresponds to frequency (or sub-channels). The programmable controller 114 may generate a second table for each sub-frame (for TDD) and store the second table in a memory, such as the main memory 122. The second table may represent the structure of the sub-frame.

In one implementation, the second table may have the following format. A start of the second table may be assumed to correspond to first OFDM symbol or slot. For example, it may be assumed that the second table starts at the first OFDM symbol or slot of the sub-frame and proceeds OFDM symbol-by-OFDM symbol (or slot-by-slot) in increasing order through the sub-frame. For instance, it may be assumed that the second table begins at the first OFDM symbol or slot in the sub-frame. The first entry may be a starting frequency coordinate (e.g., a logical subchannel number). The starting frequency coordinate generally indicates a starting frequency location of a first burst in the OFDM symbol that needs to be processed by the SS. Because some sub-channels in an OFDM symbol of a frame may not include burst data, the starting frequency location of the first burst in the second table may not be the first frequency coordinate. Also, because an SS may not need to process every burst in a sub-frame, the starting frequency location of the first burst in the second table optionally, may be different than the location of the first burst in the actual sub-frame.

After the starting frequency coordinate that indicates the starting frequency location of the first burst in the OFDM symbol, the next entry in the second table is the burst ID for the burst. Subsequent entries may correspond to increasing frequency locations or sub-channels in the OFDM symbol or slot. For each next frequency location or sub-channel, the second table may include a burst ID corresponding to that frequency location or sub-channel. For example, if at sub-channel number 38 a new burst appears, then the burst ID entry for sub-channel 38 will be different than the previous entry in the second table. If a burst at a particular frequency or sub-channel location corresponds to a vacant portion of the sub-frame or a burst that the SS need not process, the second table may include a special indicator, referred to herein as an "unused burst" indicator, that indicates that the SS need not process data at this frequency or sub-channel location. Additionally, when there are no more frequency or sub-channel locations in an OFDM symbol or slot that need to be processed by the SS, the second table may include a special indicator, referred to herein as a "move to next symbol" indicator, that indicates that no more data in the OFDM symbol or slot needs to be processed. This signals to the hardware processor 118 or the hardware processor 138 and/or the modem that there is no data at this sub-channel that needs to be processed.

Table 1 is an example first table as described above that includes burst descriptors.

TABLE 1

| Modulation | burst descriptor for burst ID 1 |
| Coding | burst descriptor for burst ID 1 |
| . . . | burst descriptor for burst ID 1 |
| Modulation | burst descriptor for burst ID 2 |
| Coding | burst descriptor for burst ID 2 |
| . . . | burst descriptor for burst ID 2 |
| Modulation | burst descriptor for burst ID 3 |
| Coding | burst descriptor for burst ID 3 |
| . . . | burst descriptor for burst ID 3 |

Table 2 is an example second table as described above that represents the structure of a sub-frame.

In effect, a table such as the example in Table 2 is a "bitmap" of the sub-frame. This representation tends to permit hardware such as the hardware processor 118 or the hardware processor 138 and/or the modem to efficiently parse the contents of a frame or sub-frame to determine the physical location of the next burst. Since each burst has a unique burst ID, this ID can then be used to index into the burst descriptor table (e.g., as in Table 1) to find out modulation, coding, etc., parameters for the burst.

TABLE 2

Starting frequency coordinate
Burst ID 1
Burst ID 1
...
Burst ID 2
Burst ID 2
...
Unused Burst
Unused Burst
...
Burst ID 3
Burst ID 3
...
Move to Next Symbol
Burst ID 1
Burst ID 1
...
Burst ID 2
Burst ID 2
...
Unused Burst
Unused Burst
...
Burst ID 3
Burst ID 3
...
Move to Next Symbol
...

Figure 5:
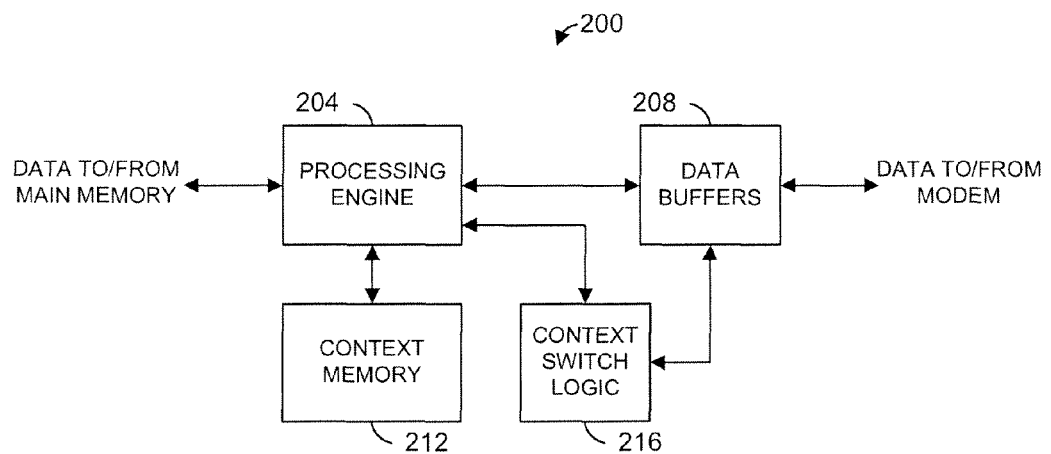
FIG. 5 is a block diagram of a context switching processor that may be utilized in the MAC processors of FIGS. 3 and 4.

As discussed above, the frame structure specified in the IEEE 802.16 Standard may be complex. For example, a plurality of bursts may be transmitted simultaneously, and each OFDM symbol in a frame may include data from a plurality of bursts. Thus, the hardware processor 118 (or 138) may need to process data from several bursts essentially simultaneously. FIG. 5 is a block diagram of a context switching processor 200 that may be utilized in the hardware processor 118 and/or the hardware processor 138 of FIGS. 3 and 4, respectively. For ease of explanation, the context switching processor 200 will be described with reference to FIGS. 3 and 4. It is to be understood, however, that the context switching processor 200 may be utilized in a MAC processor different than the MAC processors of FIGS. 3 and 4.

The context switching processor 200 generally is able to stop processing data from a burst during the middle of the burst, and then, after performing other processing, pick up processing the burst where it left off. A strictly sequential processor, on the other hand, must process all data in a burst before it can do some other processing, such as processing data from another burst. Such a sequential processor generally includes a logic element and memory to store information that is needed during processing of the burst. This information may be different than the input data or the output data, and is referred to herein as state information. The context switching processor 200 operates similar to a strictly sequential processor, but includes a context memory to save state information so that processing of a burst can be stopped and restarted mid-burst.

The context switching processor 200 includes a processing engine 204 communicatively coupled to data buffers 208. Generally, the processing engine 204 transfers data to and from the modem via the data buffers 208. For example, burst data that is received from a BS is stored by the modem in the data buffers 208. Similarly, the processing engine 204 stores burst data corresponding to data that is to be transmitted in the data buffers 208. Also, the processing engine 204 generally transfers data to and from the programmable controller 114 via the main memory 122. If the processing engine 204 is utilized in a MAC processor such as the MAC processor 130 of FIG. 4, the processing engine 204 also may transfer data to the programmable controller 114 via the TCM 134. In another embodiment, the processing engine 204 only receives data from the modem via the data buffers 208, and only processes data from the modem. In this embodiment, another processing engine is utilized for processing data that is to be provided to the modem for transmission.

The processing engine 204 generally implements MAC functions such as described above with respect to the hardware processor 118 and the hardware processor 138.

The context switching processor 200 also includes a context memory 212 and context switch logic 216. The processing engine 204 is coupled to the context memory 212, and the processing engine 204 generally stores state information in the context memory 212 when a context switch occurs. A context switch is when the processing engine 204 stops processing one burst (mid-burst) and then starts processing another burst. Thus, when a context switch occurs, the processing engine 204 also may retrieve state information from the context memory 212 corresponding to the next burst that is to be processed.

The context switch logic 216 is coupled to the processing engine 204 and to the data buffers 208. The context switch logic 216 generally determines when a context switch should occur and then signals the processing engine 204 to initiate a context switch. In another embodiment, the context switch logic 216 carries out the context switch. The context switch logic 216 also may indicate to the processing engine 204 the next burst that is to be processed.

The context switch logic 216 generally determines when a context switch should occur based on monitoring burst data received from the modem. For example, if the modem is storing burst data corresponding to a first burst, a second burst, a third burst, etc., in the data buffers 208, and the context switching processor 200 is currently processing the first burst, the context switch logic 216 may determine whether the amount of first burst data in the data buffers 208 has dropped enough to allow the processing engine 204 to stop processing the first burst temporarily. Additionally, the context switch logic 216 may determine whether the amount of any of the second burst data, the third burst data, etc., in the data buffers 208 has risen such that there is a danger that storage for the second burst data, the third burst data, etc., may run out. Additionally or alternatively, determining when a context switch should occur may be based on other factors as well.

Although context switching was described in the context of processing burst data received from the modem, processing using context switching optionally may also be implemented for burst data that is to be provided to the modem for transmission. For example, if the SS is to transmit multiple bursts in the UL frame or sub-frame, it may be useful to utilize context switching with this data. Similarly, if the processor 200 is to be utilized in a BS, the BS will need to transmit multiple DL bursts in the DL frame or sub-frame. Thus, it may be useful to utilize context switching when the processor 200 is processing data that will be provided to the modem via the data buffers 208.

In implementation in which context switching is applied to burst data that is being supplied to the modem, the context switch logic 216 generally may determine when a context switch should occur based on monitoring burst data that is being provided to the modem. For example, if the processing engine 204 is storing burst data corresponding to a first burst, a second burst, a third burst, etc., in the data buffers 208, and the context switching processor 200 is currently processing the first burst, the context switch logic 216 may determine whether the amount of first burst data in the data buffers 208 has risen such that there is a danger that storage for the first burst may run out. Additionally, the context switch logic 216 may determine whether the amount of any of the second burst data, the third burst data, etc., in the data buffers 208 has dropped such that there is a danger that the second burst data, the third burst data, etc., may run out. Additionally or alternatively, determining when a context switch should occur may be based on other factors as well. For example, the context switch logic 216 may monitor the amounts of corresponding burst data in the main memory.

Figure 6:
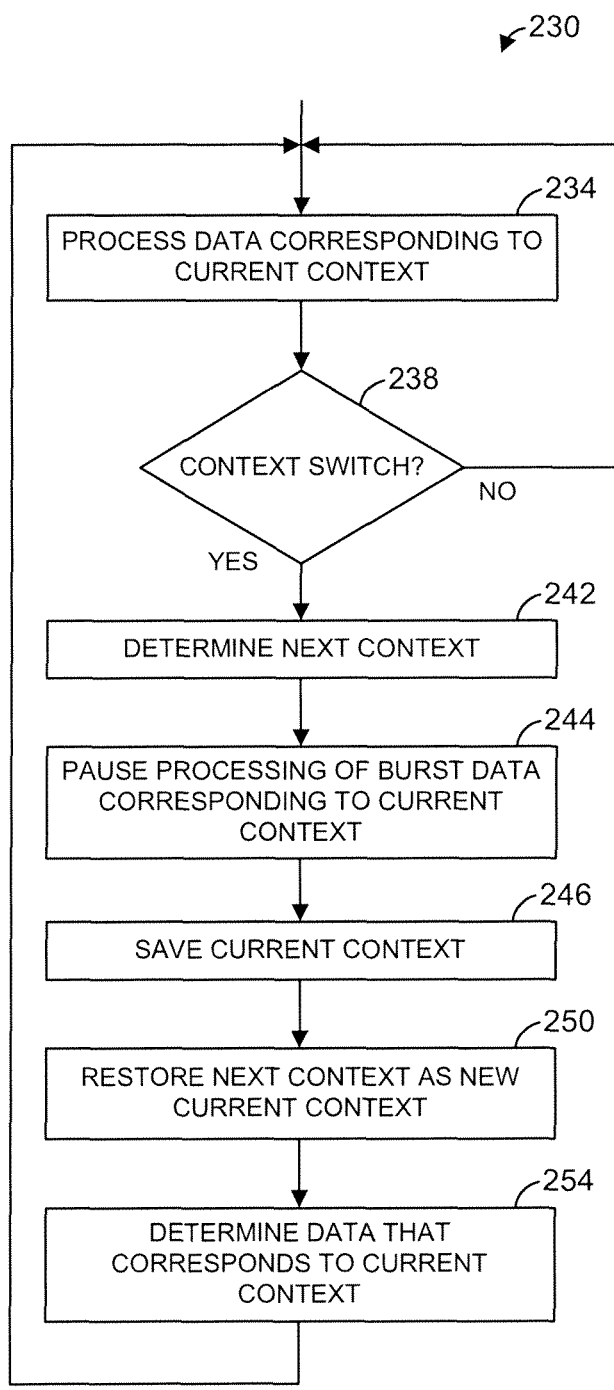
FIG. 6 is a flow diagram of an example MAC processing method that utilizes context switching.

FIG. 6 is a flow diagram of an example method 230 that utilizes context switching for MAC processing of data corresponding to a plurality bursts. The method 230 will be described with reference to FIG. 5 for ease of explanation. It will be understood, however, that the method 230 can be implemented by context switching processors other than the processor 200 of FIG. 5. The method 230 also will be described in the context of processing data received from a modem for ease of explanation. It will be understood, however, that the method 230 can be implemented optionally in the context processing data that is to be provided to the modem for transmission.

At block 234, burst data from a burst is processed, and this burst corresponds to a current context. In other words, each burst that is to be processed may correspond to a different context. In the processor 200, the processing engine 204 may be processing data corresponding to a first burst received from the modem, and the processing may include MAC processing described above with respect to the hardware processor 118 or the hardware processor 138 of FIGS. 3 and 4, respectively. At block 238, it may be determined whether a context switch should occur. For example, as describe above, the context switch logic 216 may determine when a context switch should occur based on monitoring burst data received from the modem.

If it is determined that a context switch should not occur, the flow may return to the block 234, and the burst data corresponding to the current context is continued to be processed. On the other hand, if it is determined that a context switch should occur, the flow may proceed to block 242, at which it may be determined to which other context processing should switch. For example, if there are more that two bursts to be processed, there will be more than two corresponding contexts. Thus, determining a next burst may include determining which one of other bursts should next be processed. Determining the next context may be based on a variety of information such as one or more of the amount of data of each burst stored in the data buffers 208, priorities associated with the different bursts, etc.

In some implementations, a context switch may occur only at certain points in a burst, such as at certain data boundaries in a burst. For example, a context switch may occur only at the boundaries of certain data units. In one implementation, a context switch may occur at MSDU boundaries and MSDU fragment boundaries. Thus, the context switch logic 216 may determine when a context switch should occur further based on when the processing engine 204 is at a data unit boundary that will permit a context switch. Optionally, the processing engine 204 will, after receiving a context switch signal from the context switch unit 216, determine the next point at which a context switch is permitted.

At block 244, processing of the burst data corresponding to the current context may be paused. For example, the context switch logic 216 may generate a signal that causes the processing engine 204 to pause processing. In one implementation, processing of burst data is paused at certain data boundaries in the burst data.

At block 246, the current context is saved. For example, the state information corresponding to the current context is saved to the context memory 212. In one implementation, the context switch logic 216 may generate control signals to store the state information corresponding to the current context to the context memory 212. In another implementation, the processing engine 204 generates control signals to store the state information corresponding to the current context to the context memory 212.

At block 250, the next context (determined at block 242) is restored. For example, the state information corresponding to the next context is retrieved from the context memory 212 and stored in corresponding memories (e.g., registers) in the processing engine 204. In one implementation, the context switch logic 216 may generate control signals to retrieve the state information corresponding to the next context from the context memory 212. In another implementation, the processing engine 204 generates control signals to retrieve the state information corresponding to the next context from the context memory 212. If the next context corresponds to a burst that the processing engine has not previously started processing, restoring the next context may include initializing the state information. Optionally, the initialized state information may be stored in the context memory 212 so that it can be retrieved and stored in the corresponding memories in the processing engine 204. As another option, storing the initialized state information in the context memory 212 may be omitted, and the initialized state information may be stored directly in the corresponding memories of the processing engine 204.

At block 254, burst data corresponding to the new current context may be determined. For example, if data corresponding to different bursts are stored in the different buffers in the data buffers 208, the buffer corresponding to the new current context may be determined. The context switch logic 216 may determine which data buffer corresponds to the current context and may provide this information to the processing engine 204.

Then, the flow may proceed back to block 234, at which processing of burst data is resumed, but now in a different context. For example, the context switch logic 216 may generate a signal that indicates to the processing engine 204 that it can resume processing burst data.

In an alternative implementation, the context switch logic 216 may merely generate a signal that indicates that a context switch should occur and, optionally, another signal to indicate the next context. In this implementation, the processing engine 204 may handle pausing processing, storing the current context, retrieving the next context, determining the data buffer corresponding to the next context, and resuming processing.

Figure 7:
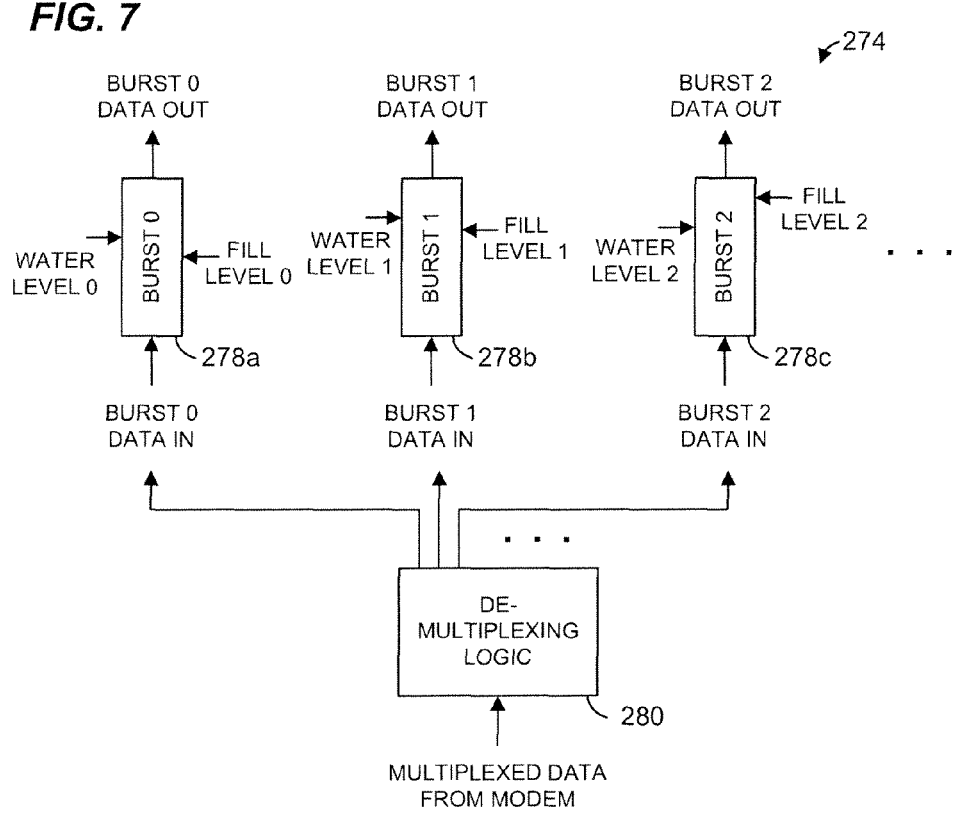
FIG. 7 is a block diagram of an example data buffer system that may be utilized in the example context switching processor of FIG. 5.

FIG. 7 is a block diagram of an example data buffer system 274 that may be utilized as the data buffers 208 of FIG. 5. The data buffer system 274 will be described with reference to FIG. 5 for ease of explanation. Of course, the data buffer system 274 may be utilized in other MAC processors besides the processor 200 of FIG. 5, and the processor of FIG. 5 need not utilize the data buffer system 274.

The data buffer system 274 includes a plurality of first-in-first-out (FIFO) buffers 278. Although three FIFO buffers 278 are illustrated in FIG. 7, different number of FIFO buffers 278 will typically be utilized. Data corresponding to different bursts are stored in associated FIFO buffers 278. In other words, data corresponding to a first burst, a second burst, a third burst, etc., are stored in the FIFO buffers 278a, 278b, 278c, etc., respectively. In generally the number of FIFO buffers 278 may be selected based on an expected maximum number of bursts that can be transmitted in a DL frame or sub-frame.

If data is received from the modem in a multiplexed stream, the data buffer system 274 may include a demultiplexer 280 to demultiplex the stream. In operation, burst data received form the modem is stored in appropriate ones of the FIFO buffers 278.

Each FIFO buffer 278 includes logic to generate a signal that indicates when the amount of data in the FIFO buffer 278 is above a level, referred to herein as a "water level". Generally, the water level of each FIFO buffer 278 is configurable. In one implementation, the water level of each FIFO buffer 278 is configurable independent of the water levels of the other FIFO buffers 278. In other words, the water levels of the FIFO buffers 278 may each be different. The water levels of the different buffers 278 can be programmed or configured based on processing bandwidth requirements for the different bursts corresponding to the FIFO buffers 278, for example. Additionally, each FIFO buffer 278 includes logic to generate a signal that indicates when the amount of data in the FIFO buffer 278 is below the water level. The signals that indicate when the amount of data in the FIFO buffer 278 is above the water level and when the amount of data in the FIFO buffer 278 is below the water level may be a single signal or two different signals.

The signal or signals that indicate when the amount of data in the FIFO buffer 278 is above the water level and when the amount of data in the FIFO buffer 278 is below the water level may be provided to the context switch logic 216. The context switch logic 216 may treat a signal from a buffer 278 that corresponds to a different context and that indicates that the amount of data is above the water level as a request for a context switch. Additionally, a signal from the FIFO buffer 278 corresponding to the current context that indicates that the amount of data in the FIFO buffer 278 is below the water level may be treated as a signal indicating that processing of the current context may be paused. If multiple buffers 278 indicate that their respective water levels have been exceeded, the context switch logic 216 may determine which of the corresponding plurality of contexts should be the next context. For example, the context switch logic 216 may determine the next context as corresponding to the first buffer than indicated that its water level was exceeded. Additionally or alternatively, different buffers 278 may be assigned different priorities, and the switch logic 216 may determine the next context based on the priorities. The priorities may be configurable.

Figure 8:
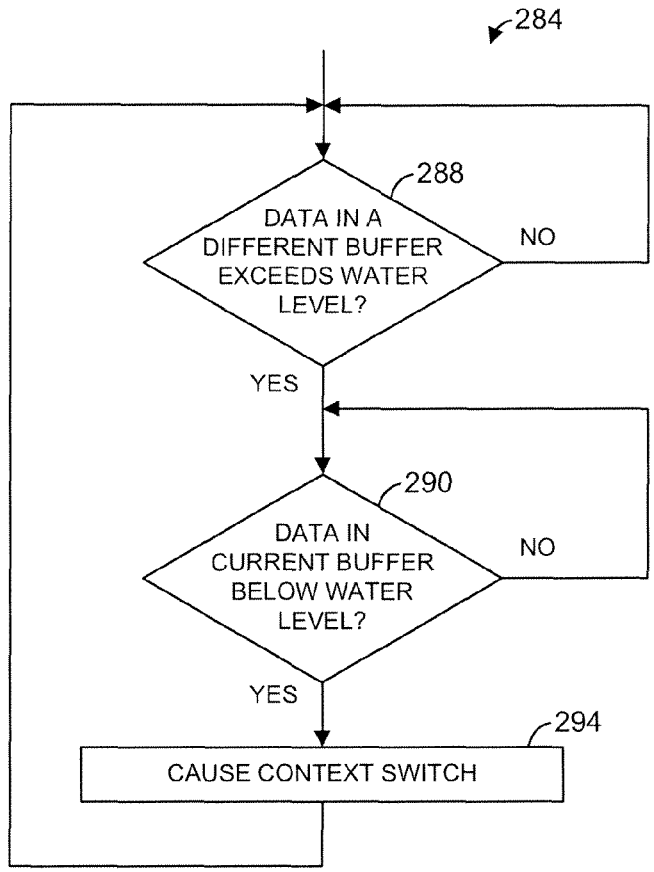
FIG. 8 is a flow diagram of an example method for determining when a context switch should occur.

FIG. 8 is a flow diagram of an example method 284 for determining when a context switch should occur. The method 284 may be utilized with a data buffer system such as the data buffer system 274 of FIG. 7, and will be described with reference to FIG. 7 for ease of explanation. The method 284 may be implemented by the context switch logic 216 (FIG. 5), for example. Of course, the context switch logic 216, need not implement the method 284, and the method 284 may be utilized in a processor different than the processor 200 of FIG. 5 and with a buffer system different than the buffers system 274.

At block 288, it may be determined whether the amount of data in a buffer 278 that corresponds to a context different than the current context has exceeded the corresponding water level. Foe example, the context switch logic 216 may monitor the water level signals from the buffers 278 to determine whether a water level corresponding to a context different than the current context has been exceeded. If it is determined at block 288 that a water level has not been exceeded, the flow may loop back to block 288. On the other hand, if it is determined at block 288 that a water level has been exceeded, the flow may proceed to block 290.

At block 290, it may be determined whether the amount of data in the buffer 278 corresponding to the current context is below the corresponding water level. If it is determined that the amount of data in the buffer 278 corresponding to the current context is not below the corresponding water level, the flow may loop back to block 290. On the other hand, if it is determined that the amount of data in the buffer 278 corresponding to the current context is below the corresponding water level, the flow may proceed to block 294.

At block 294, a context switch may be initiated. For example, the context switch logic 216 may cause a context switch, or generate a signal that causes the processing engine 204 implement a context switch.

In general, WiMAX MAC functions may be partitioned into two categories: functions that process control flow and functions that process data flow. Control flow generally carries information that configures the MAC processor into a particular state. Configuring the MAC processor into a particular state may enable the MAC processor to receive a portion of a WiMAX frame, for example. On the other hand, the data flow generally carries frame data to and from upper protocol layers while doing certain transformations, such as packing and unpacking data into MPDUs.

Figure 9:
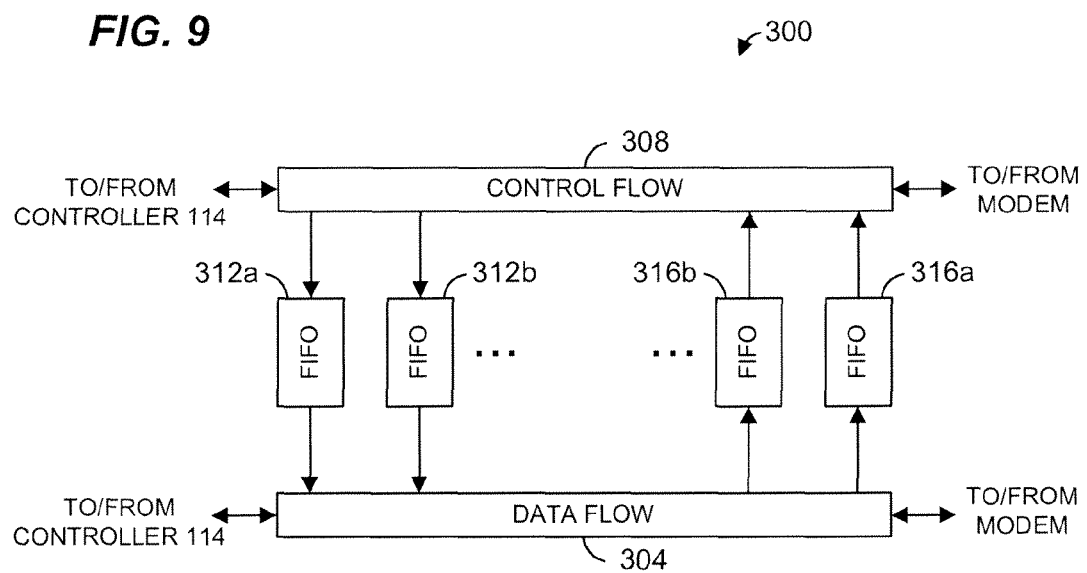
FIG. 9 is a block diagram of an example hardware processor for implementing MAC functions in a MAC processor.

FIG. 9 is a block diagram of an example hardware processor 300 for implementing certain MAC functions in a MAC processor. Referring to FIGS. 3 and 4, the hardware processor 300 may be utilized as the hardware processor 118 and/or the hardware processor 138, and FIG. 9 will be described with reference to FIGS. 3 and 4 for ease of explanation. It will be understood, however, that the hardware processor 118 and the hardware processor 138 need not have the structure illustrated in FIG. 9. Similarly, the hardware processor 300 may be implemented in a MAC processor different than the MAC processors 100 and 130 of FIGS. 3 and 4.

In the hardware processor 300, hardware for implementing MAC functionality is generally partitioned into a data flow portion 304 and a control flow portion 308. The data flow portion 304 generally performs MAC functions that process the data flow, and the control flow portion 308 generally performs MAC functions that process the control flow. For example, the data flow portion 304 may perform one or more of parsing of MPDUs, computing and checking CRCs, performing encryption and/or decryption when appropriate, etc. With regard to the control flow portion 308, it may perform one or more of configuring the modem with burst information on a slot by slot basis, configuring zone information, writing to configuration registers in the modem, etc. The control flow portion 308 also may extract information from commands received from the programmable controller 114, and may provide such information to the data flow portion 304. In the example hardware processor 300, the data flow portion 304 and the control flow portion 308 may exchange information or send signals to one another via one or more FIFO buffers 312, 316. Example of information exchanged between the control flow portion 308 and the data flow portion 304 are burst length, pointers to a CID table that includes or points to an encryption key, an indication of a burst type such as a normal burst or a hybrid ARQ (HARQ) burst. The control flow portion 308 may provide information to the data flow portion 304 via one or more FIFO buffers 312. As another example, the data flow portion 304 may provide information to the control flow portion 308 via one or more FIFO buffers 316. Although two FIFO buffers 312 are illustrated in FIG. 9, there may be only FIFO buffer 312 or there may be three or more FIFO buffers 312. Similarly, although two FIFO buffers 316 are illustrated in FIG. 9, there may be only FIFO buffer 316 or there may be three or more FIFO buffers 316.

The structure of the hardware processor 300 helps to keep the data flow 304 more independent from the control flow 308. For example, if the control flow portion 308 needs to provide information to the data flow portion 304, the control flow portion 308 does not need to wait for the data flow portion 304 to utilize the information before the control flow portion 308 can resume control flow processing. Rather, the control flow portion 308 can store the information in one of the FIFO buffers 312 and immediately resume control flow processing. The data flow portion 304 can retrieve the stored information from the FIFO buffer 312 at a subsequent time. By choosing appropriate sizes for the buffers 312, 316, bursty delays by the data flow portion 304 and/or the control flow portion 308 may be smoothed.

Figure 10A:
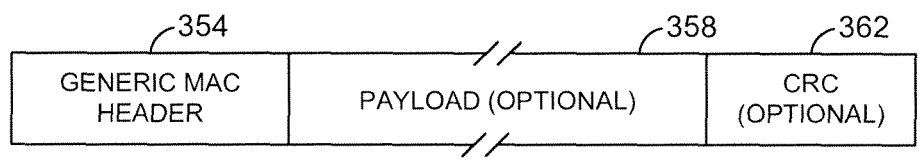
FIG. 10A is a diagram of an example MPDU as specified in the IEEE 802.16 Standard.

FIG. 10A is a diagram of an example MPDU 350 as specified in the *IEEE Standard for Local and Metropolitan Area Networks; Part 16: Air Interface for Fixed Broadband Wireless Access Systems*, IEEE Standard 802.16-2004 (October. 2004) (hereinafter "IEEE Standard 802.16-2004"). The MPDU 350 includes a generic MAC header (GMH) 354. Optionally, the MPDU 350 may include a payload 358 and/or a CRC field 362.

Figure 10B:
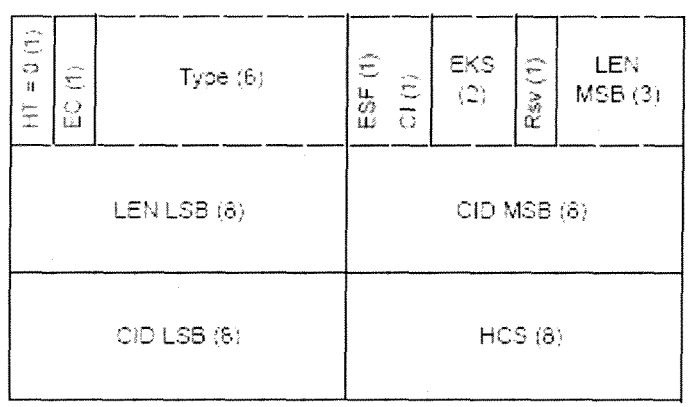
FIG. 10B is a diagram illustrating a format of a generic MAC header (GMH) as specified in the IEEE 802.16 Standard.

FIG. 10B is a diagram illustrating a format of the GMH 354 as specified in the IEEE Standard 802.16e-2005. The GMH 354 includes a header type (HT) field, an encryption control (EC) field, a type field, an extended subheader (ESF) field, a CRC indicator (CI) field, an encryption key sequence (EKS) field, a length (LEN) field (most significant bits (MSB) and least significant bits (LSB)), a connection identifier (CI) field (MSB and LSB), and a header check sequence (HCS). The EC field indicates whether the payload 358 is encrypted. The type field generally provides information about the payload. The ESF field indicates whether an extended subheader field immediately follows the GMH 354. The CI field indicates whether the CRC field 362 is included in the MPDU 350. The EKS field provides encryption information if the payload is encrypted. The LEN field indicates the length in bytes of the MPDU 350, including the GMH 354 and the CRC field 362 if present. The CID field includes a connection identifier value. The HCS field is an 8-bit field used to detect errors in the header. The HCS field is a checksum calculated by the transmitter based on the first five bytes of the GMH 354. Upon reception, the receiver calculates a checksum based on the first five bytes that are received and compares the result to the value in the HCS field. If there is a difference, it is determined that there is an error in the GMH 354.

If there are too many errors, however, the checksum of the first five received bytes may still be the same as the HCS field in certain circumstances. Thus, the HCS field may not always detect that there are errors in the GMH 354.

Figure 11:
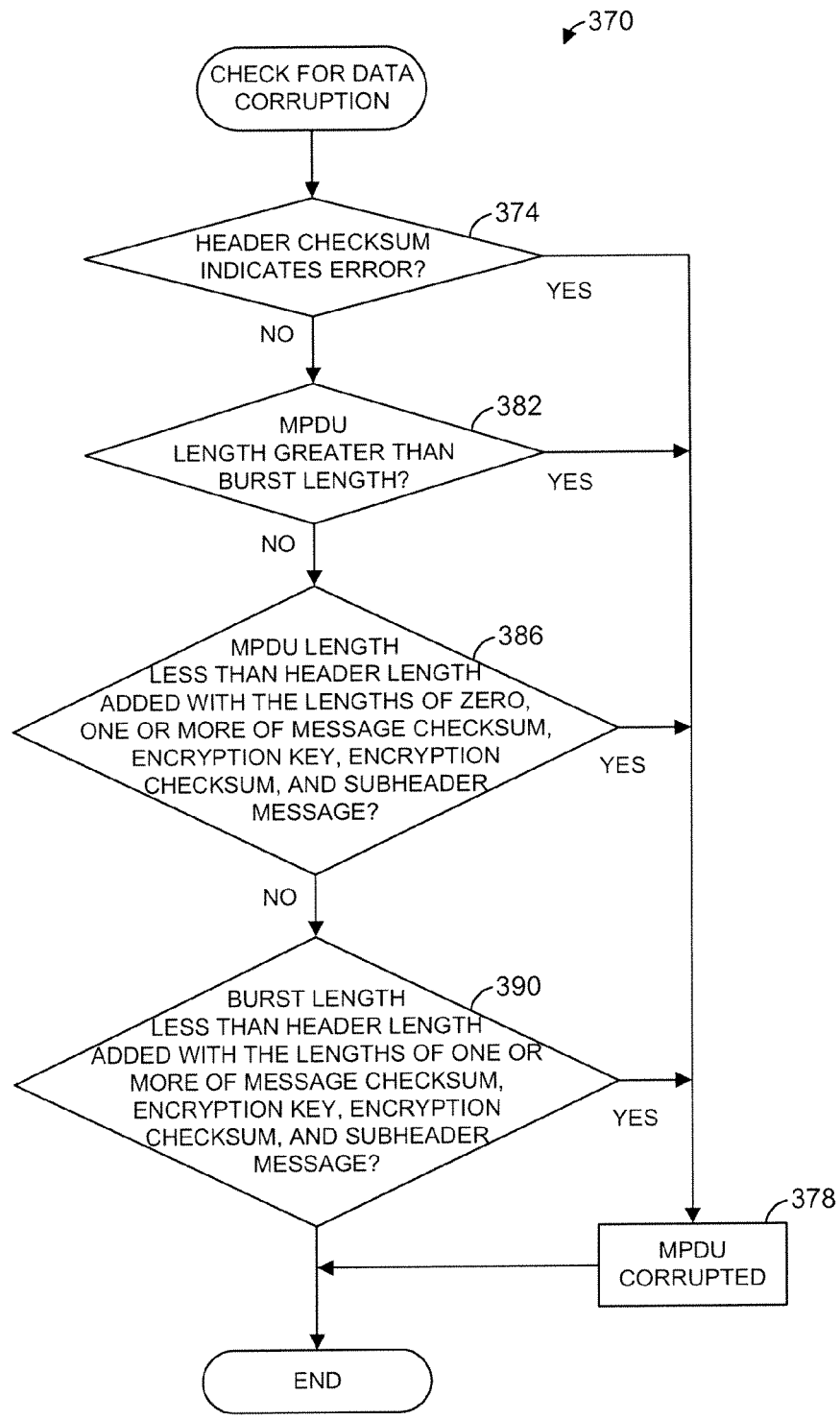
FIG. 11 is a flow diagram of an example method for checking for errors in an MPDU.

FIG. 11 is a flow diagram of an example method 370 that may be utilized to check for errors in the GMH and/or an MPDU that includes the GMH. The method 370 may detect errors in the GMH or the MPDU that are not detectable based on performing the GMH checksum calculation and comparison with the HCS field as described above. The method 370 may be implemented by the hardware processor 118 or the hardware processor 138, for example. It will be understood, however, that the method 370 may be implemented by a MAC processor other than the MAC processor 100 and the MAC processor 130 of FIGS. 3 and 4. Additionally, the hardware processor 118 and the hardware processor 138 need not implement the method 370.

At block 374, a checksum may be calculated based on the first five bytes of the GMH 354 and the result may be compared to the HCS field. If the calculated checksum is not the same as the HCS field this may indicate an error in the GMH, and the flow may proceed to block 378. At block 378, an indication that the GMH is corrupted may be generated and the flow may end. On the other hand, if at block 374 it is determined that the checksum and HCS comparison does not indicate an error, the flow may proceed to block 382.

At block 382, the LEN field is compared to the length of the burst in which the MPDU was included. The length of the burst in bytes may be determined based on information in the DL-MAP, for example. If the LEN field indicates that the length of the MPDU is greater than the length of the burst, this may indicate an error in the GMH and the flow may proceed to block 378. On the other hand, if at block 382 it is determined that the LEN and burst length comparison does not indicate an error, the flow may proceed to block 386.

At block 386, one or more of a plurality of comparisons may be made based on the LEN field. A numbered list of comparisons is provided below, and one or more of these numbered comparisons may be made. The numbering in this list does not indicate a particular order in which the comparisons should be made. On the contrary, if multiple comparisons are made, such comparisons need not be made in any particular order. 1) The LEN field value may be compared to the length of the GMH (six bytes). If the LEN field value is less than the length of the GMH, this indicates an error in the GMH and the flow may proceed to block 378. On the other hand, if it is determined that the LEN field value is not less than the length of the GMH, the flow may proceed to block 390 or another comparison at block 386 may be made. 2) If the CI field indicates that a CRC field is included in the MPDU, the LEN field value may be compared to the sum of the length of the GMH and the CRC field. If the LEN field value is less than the sum of the lengths of the GMH and the CRC field, this indicates an error in the GMH and the flow may proceed to block 378. On the other hand, if it is determined that the LEN field value is not less than the sum of the lengths of the GMH and the CRC field, the flow may proceed to block 390 or another comparison at block 386 may be made. 3) If the EC field indicates that encryption is utilized, the MPDU should include a 4-byte packet number (PN) field and an 8-byte message authentication code field. Thus, the LEN field value may be compared to the sum of the length of the GMH, the length of the PN field and the length of the message authentication code field. If the LEN field value is less than the sum of the lengths of the GMH, the PN and the message authentication code fields, this indicates an error in the GMH and the flow may proceed to block 378. On the other hand, if it is determined that the LEN field value is not less than the sum of the lengths of the lengths of the GMH, the PN and the message authentication code fields, the flow may proceed to block 390 or another comparison at block 386 may be made. 4) If the ESF field indicates that an extended subheader field is included in the MPDU, the extended subheader field will include an extended subheader group length that indicates the length of the extended subheader group. Thus, the LEN field value may be compared to the sum of the length of the GMH and the length of the subheader group. If the LEN field value is less than the sum of the lengths of the GMH and the subheader group, this indicates an error in the MPDU and the flow may proceed to block 378. On the other hand, if it is determined that the LEN field value is not less than the sum of the lengths of the GMH and the subheader group, the flow may proceed to block 390 or another comparison at block 386 may be made. Various combinations of the above four comparisons may also be made. For example, If the CI field indicates that a CRC field is included in the MPDU, if the EC field indicates that encryption is utilized, and if the ESF field indicates that an extended subheader field is included in the MPDU, the LEN field value may be compared to the sum of the length of the GMH, the CRC field, the length of the PN field, the length of the message authentication code field, and the length of the extended subheader group. If the LEN field value is less than the sum of the lengths of the GMH, the CRC field, the length of the PN field, the length of the message authentication code field, and the length of the extended subheader group, this indicates an error in the MPDU and the flow may proceed to block 378.

At block 390, one or more of a plurality of comparisons may be made based on the length of the burst. A numbered list of comparisons is provided below, and one or more of these numbered comparisons may be made. The numbering in this list does not indicate a particular order in which the comparisons should be made. On the contrary, if multiple comparisons are made, such comparisons need not be made in any particular order. 1) If the CI field indicates that a CRC field is included in the MPDU, the burst length may be compared to the sum of the length of the GMH and the CRC field. If the burst length is less than the sum of the lengths of the GMH and the CRC field, this indicates an error in the GMH and the flow may proceed to block 378. On the other hand, if it is determined that the burst length is not less than the sum of the lengths of the GMH and the CRC field, the flow may end or another comparison at block 390 may be made. 2) If the EC field indicates that encryption is utilized, the MPDU should include the 4-byte PN field and the 8-byte message authentication code field. Thus, the burst length may be compared to the sum of the length of the GMH, the length of the PN field and the length of the message authentication code field. If the burst length is less than the sum of the lengths of the GMH, the PN and the message authentication code fields, this indicates an error in the GMH and the flow may proceed to block 378. On the other hand, if it is determined that the burst length is not less than the sum of the lengths of the GMH, the PN and the message authentication code fields, the flow may end or another comparison at block 390 may be made. 3) If the ESF field indicates that an extended subheader field is included in the MPDU, the burst length may be compared to the sum of the length of the GMH and the length of the subheader group. If the burst length is less than the sum of the length of the GMH and the length of the subheader group, this indicates an error in the MPDU and the flow may proceed to block 378. On the other hand, if it is determined that the burst length is not less than the sum of the lengths of the GMH and the subheader group, the flow may end or another comparison at block 390 may be made. Similar to the block 386, various combinations of the three listed comparisons also may be made.

If it is determined that the MPDU is corrupted, decoding of the MPDU or the current burst may be aborted. This may include the hardware processor 118 or 138 flushing a pipeline that was processing the MPDU or the burst. Additionally, memory associated with the MPDU or the burst may be cleaned up to prevent erroneous information from being propagated and possibly contaminating upper portions of the MAC protocol. Additionally, an error detection message may be communicated to programmable controller 114. In one optional implementation, the results of the various comparisons performed may be stored in the HCS field of the GMH. The programmable controller 114 may then analyze the HCS field to determine if any MPDU errors were detected by the hardware processor 118, 138.

Figure 12:
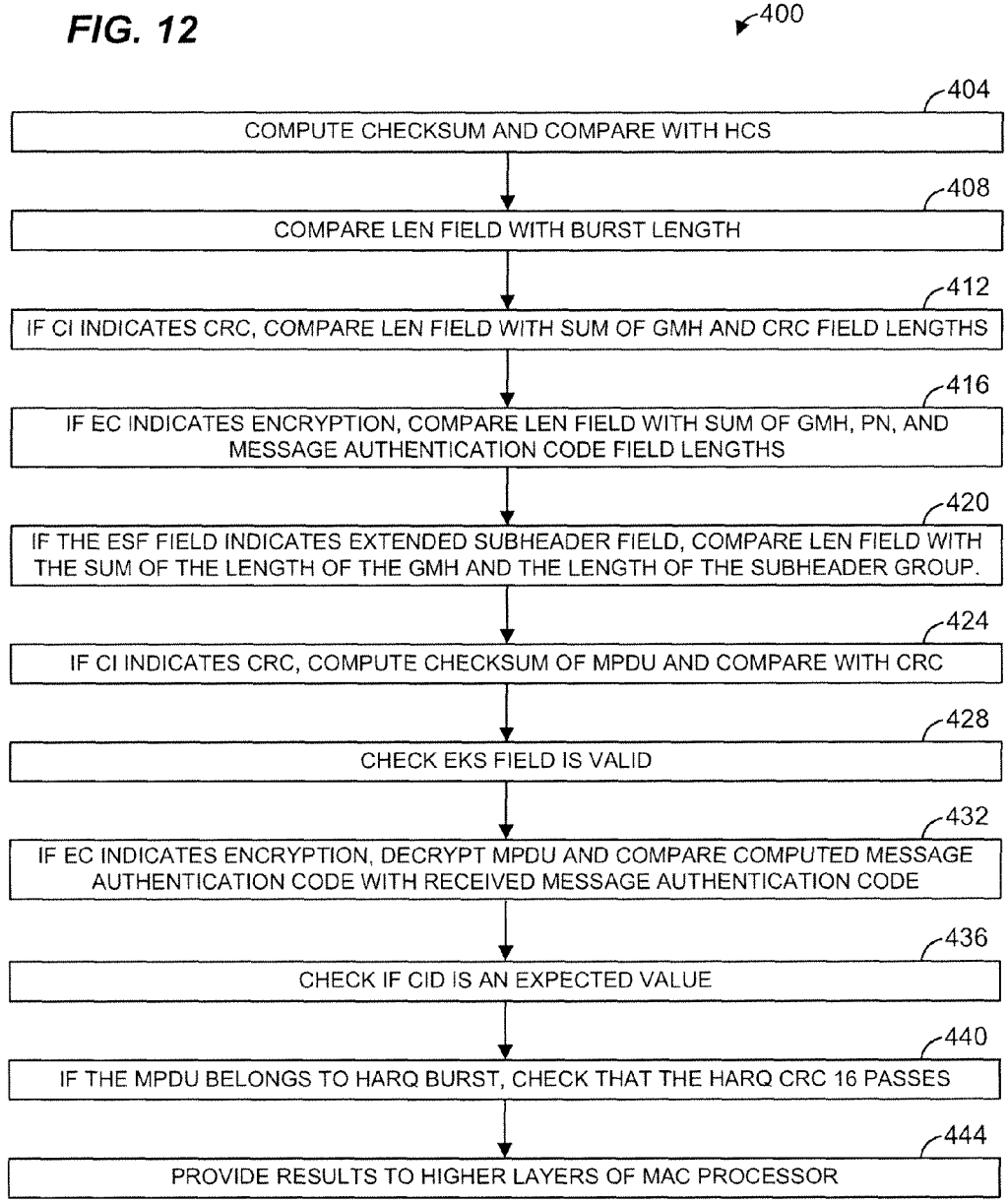
FIG. 12 is a flow diagram of another example method for checking for errors in an MPDU.

FIG. 12 is a flow diagram of an example method 400 that may be utilized to check for errors in the GMH and/or an MPDU that includes the GMH. The method 400 may detect errors in the GMH or the MPDU that are not detectable based on merely performing a GMH checksum calculation and comparison with the HCS field. The method 400 may be implemented by the hardware processor 118 or the hardware processor 138, for example. It will be understood, however, that the method 400 may be implemented by a MAC processor other than the MAC processor 100 and the MAC processor 130 of FIGS. 3 and 4. Additionally, the hardware processor 118 and the hardware processor 138 need not implement the method 400.

At block 404, a checksum is computed for the first five bytes in the GMH, and the checksum is compared with the received HCS field value. If the computed checksum is different than the received HCS, this may indicate an error in the GMH.

At block 408, the value of the LEN field is compared to the burst length. If the LEN field indicates a length that is too large to fit within the burst, this may indicate an error in the GMH.

At block 412, if the CI field indicates that the MPDU includes a CRC field, the LEN field is compared to the sum of the lengths of the GMH and the CRC field. If the LEN field value is less than the sum of the lengths of the GMH and the CRC field, this may indicate an error in the GMH.

At block 416, if the EC field indicates encryption, the LEN field is compared to the sum of the lengths of the GMH, the PN field and the message authentication code field. If the LEN field value is less than the sum of the lengths of the GMH, the PN field, and the message authentication code field, this may indicate an error in the GMH.

At block 420, if the ESH field indicates an extended subheader is included, the LEN field is compared to the sum of the length of the GMH and the length of the subheader group. If the LEN field value is less than the sum of the length of the GMH and the length of the subheader group, this may indicate an error in the MPDU.

At block 420, if the ESH field indicates an extended subheader is included, the LEN field is compared to the sum of the length of the GMH and the length of the subheader group. If the LEN field value is less than the sum of the length of the GMH and the length of the subheader group, this may indicate an error in the MPDU.

At block 424, if the CI field indicates that the MPDU includes a CRC field, a checksum of the MPDU is computed and the result is compared to the MPDU CRC. If the computed checksum is different than the MPDU CRC, this indicates an error in the MPDU.

At block 428, the EKS field is compared to expected values of the EKS field. If the EKS field is not an expected value, this may indicate an error in the GMH.

At block 432, if the EC field indicates encryption, the MPDU is decrypted and a message authentication code is computed. If the computed message authentication code does not matches the received message authentication code, this indicates an error in the MPDU.

At block 436, the CID field value is compared to one or more expected CID values. If the CID field is not an expected value, this may indicate an error.

At block 440, if the MPDU belongs to a hybrid ARQ (HARQ) burst, a checksum may be computed and compared to a received HARQ CRC. If the computed checksum does not match the received checksum, this may indicate an error in the MPDU.

After performing the checks corresponding to blocks 404, 408, 412, 416, 420, 424, 428, 432, 436 and 440, the results may be communicated to the programmable controller 114 at block 444. Optionally, if a check indicates an error, subsequent checks may be skipped and the flow may proceed directly to block 444.

In the implementation of FIG. 12, the HCS field of the MPDU is used to communicate some of the results of MPDU processing to the higher layers of the MAC implemented by the programmable controller 114. Table 3 indicates one example of how results may be stored in the HCS field. In Table, the first row indicates the bit number in the HCS field.

TABLE 3

| 7 | 6 | 5 | 4 | 3 | 2 | 1 | 0 |
|---|---|---|---|---|---|---|---|
| Null MPDU | Rsvd | ESH Failed | EKS invalid | Decryption Failed | CRC-32 failed | CRC-16 failed (harq) | HCS failed |

Thus, an indication of the result of the comparison of block 404 may be stored in bit 0. An indication of the result of the comparison of block 440 may be stored in bit 1. An indication of the result of the comparison of block 424 may be stored in bit 2. An indication of the comparison of block 432 may be stored in bit 3. An indication of the comparison of block 428 may be stored in bit 4. An indication of the comparison of block 420 may be stored in bit 5. By communicating results via the HCS field, this tends to reduce communication overhead between the hardware processor 118, 138 and the programmable controller 114. Additionally, the programmable controller 114 may be able to process the information more quickly because the information is condensed into a single byte.

Figure 13:
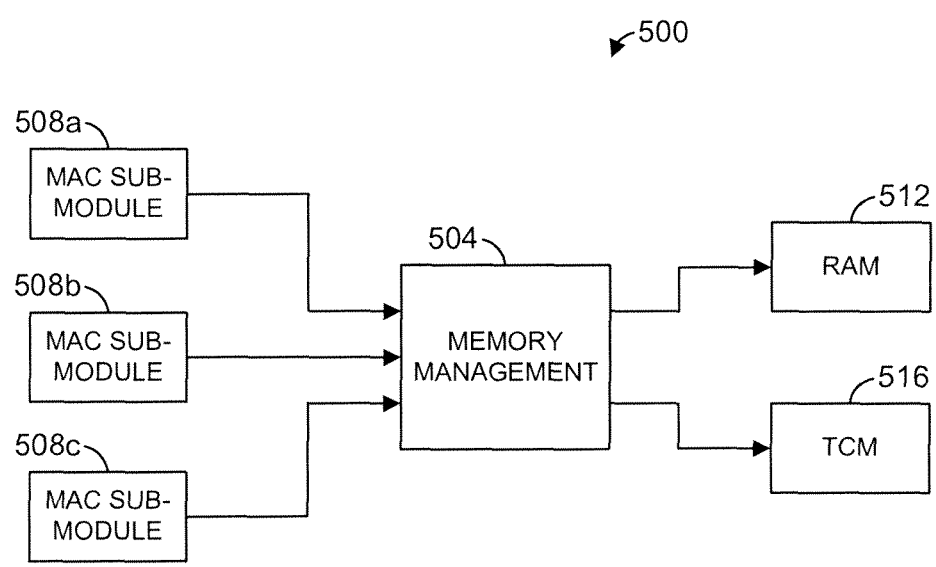
FIG. 13 is a block diagram of an example memory management system that may be utilized in the MAC processors of FIGS. 3 and 4.

FIG. 13 is a block diagram of an example memory management system 500 that may be utilized in the programmable controller 114 of FIGS. 3 and/or 4. For ease of explanation, the memory management system will be described with reference to FIGS. 3 and 4. It will be understood, however, that the memory management system 500 may be implemented by a MAC processor other than the MAC processor 100 and the MAC processor 130 of FIGS. 3 and 4. Additionally, the programmable controller 114 need not implement the memory management system 500.

The memory management system 500 includes a memory management module 504 that generally interfaces MAC sub-modules 508 to memories 512 and 516. Although three MAC sub-modules 508 are illustrated in FIG. 13, there may be more or less MAC sub-modules 508, such as one, two, four, five, six, etc. Each MAC sub-module 508 may implement MAC functionality and is implemented by the programmable controller 114. For example, each MAC sub-module 508 may correspond to MAC functionality being performed on respective bursts. The memory management module 504 also may be implemented by the programmable controller 114. In other words, the MAC sub-modules 508 and the memory management module 504 may correspond to machine readable instructions executed by the programmable controller 114.

As discussed above, the memory management module 504 is coupled to memories 512, 516. Although two memories 512 and 516 are illustrated in FIG. 13, there may be different numbers of memories such as one, three, four, five, etc. The memory management module 504 may be coupled to one or more low latency memories 516. For example, the one or more low latency memories 516 may be TCM. Additionally, memory management module 504 may be coupled to one or higher latency memories 512, such as RAM coupled to a system bus of a MAC processor. For example, the memory 512 may correspond to the main memory 122 of FIGS. 3 and 4.

In one embodiment, the memory management module 504 may act to transparently partition a single block of memory, such as a single block of RAM 512 or a single block of TCM 516, into a plurality of different regions corresponding to the sub-modules 508. Each sub-module 508, however, may not be aware of the partitioning. Rather, it may appear to each sub-module 508 that it can access the entire block of memory. For example, when a sub-module 508 is instantiated or when the sub-module 508 requests memory access, for example, the memory management module 504 may assign a region of memory to the memory management module 504. If the memory management module 504 detects that the sub-module 508 will exceed usage of the assigned memory region, the memory management module 504 may select a further memory region from memory regions identified as free, and assign the selected memory region to the sub-module 508. Additionally, the memory management module 504 may act to make the different regions assigned to the sub-module appear to the sub-module to be a contiguous block of physical memory. Similarly, if the memory management module 504 detects that a sub-module 508 will no long need an already assigned memory region, the memory management module 504 may de-assign the memory region from the sub-module and classify the memory region as free.

In another embodiment, the memory management module 504 may act to make multiple blocks of memory appear as a unified memory to the sub-modules 508. For example, as discussed above, different physical memories (e.g., RAM 512 and TCM 516) may have different interfaces, access times, etc. The memory management module 504 may provide a single virtual interface to the different memories 512, 516. Additionally, the memory management module 504 may include logic to decide which memory should be accessed. For example, if a sub-module 508 is processing a UL-MAP, the memory management module 504 may determine that UL-MAP data is stored in the TCM 516. Thus, the memory management module 504 may determine that memory accesses by the sub-module should correspond to access to the TCM 516. On the other hand, if the memory management module 504 determines that a sub-module is processing non-MAP data, for example, the memory management module 504 may determine that memory accesses by the sub-module 508 should correspond to access to the RAM 512. In this example, the memory management module 504 alleviates the need for each sub-module to have multiple interfaces to the different memories, and the memory management module 504 presents a single virtual interface to the sub-modules 508. Additionally, the memory management module 504 helps ensure that latency requirements are met because all accesses to the low latency TCM 516 are centralized within the memory management module 504, and the memory management module 504 helps to ensure that accesses to higher latency RAM 512 will not block accesses to the lower latency TCM 516.

As discussed above, one or more of the methods 230, 284, 370 and 400, or portions of these methods (or similar methods) may be implemented by hardware processor such as the hardware processors 118 and 138 of FIGS. 3 and 4. More generally, however, these methods may be implemented in hardware, firmware, software, or any combination of hardware, firmware, and/or software. Similarly, the memory management module 504, or portions thereof (or a similar module) may be implemented by a programmable controller, such as the programmable controller 114 of FIGS. 3 and 4, that executes machine readable instructions. More generally, however, the memory management module 504 may be implemented in hardware, firmware, software, or any combination of hardware, firmware, and/or software. Similarly, various of the blocks in FIGS. 3-5, 7 and 9 may generally be implemented in hardware, firmware, software, or any combination of hardware, firmware, and/or software.

When a block is implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A media access control (MAC) processor, comprising:
a programmable controller configured to execute machine readable instructions for implementing MAC functions corresponding to data received by a communication device;
tightly coupled memory associated with the programmable controller;
a system memory coupled to the programmable controller via a system bus, wherein
the programmable controller accesses data stored in the tightly coupled memory at a first data rate and accesses data stored in the system memory at a second data rate, and
the first data rate is faster than the second data rate;
a hardware processor coupled to the system bus and to the tightly coupled memory that is associated with the programmable controller,
wherein the hardware processor is configured to:
implement MAC functions on data received in a communication frame,
store, in the tightly coupled memory, a first subset of data in a first sub-frame of the communication frame that indicates a structure of downlink data in the communication frame, and
store, in the system memory, a second subset of data in the first sub-frame other than the first subset of data.

2. The MAC processor of claim 1, wherein the hardware processor is configured to store, in the tightly coupled memory, a third subset of data in a second sub-frame of the communication frame that indicates a structure of uplink data in the communication frame.

3. The MAC processor of claim 2, wherein the second sub-frame comprises:
an uplink sub-frame, and
wherein the third subset of data corresponds to an uplink map (UL-MAP) in the uplink sub-frame.

4. The MAC processor of claim 1, wherein the programmable controller executes machine readable instructions for:
determining a structure of the communication frame based on the data that indicates the structure of downlink data in the communication frame; and
communicating the determined structure of the communication frame to the hardware processor.

5. The MAC processor of claim 1, wherein the programmable controller executes machine readable instructions for communicating the determined structure of the communication frame to the hardware processor by storing frame structure information in the system memory.

6. The MAC processor of claim 1, wherein the communication frame conforms to the IEEE 802.16 Standard.

7. The MAC processor of claim 1, wherein the hardware processor is further configured to implement MAC functions on data received in the communication frame.

8. The MAC processor of claim 1, wherein the tightly coupled memory is part of a core of the programmable controller.

9. The MAC processor of claim 1, wherein the first sub-frame comprises:
a downlink sub-frame, and
wherein the first subset of data corresponds to a downlink map (DL-MAP) in the downlink sub-frame.

10. A method, comprising:
processing, with a hardware processor, data in a communication frame received by a communication device;
determining, with the hardware processor, that a first subset of data in a first sub-frame of the communication frame corresponds to data that indicates a structure of downlink data in the communication frame;
storing, in a tightly coupled memory of a programmable controller, the first subset of data;
storing, in a system memory coupled to the programmable controller via a system bus, a second subset of data in the first sub-frame other than the first subset of data;
reading, with the programmable controller, the first subset of data stored in the tightly coupled memory at a first data rate; and
reading, with the programmable controller, the second subset of data stored in the system memory at a second data rate that is slower than the first data rate.

11. The method of claim 10, further comprising:
determining, with the hardware processor, that a third subset of data in a second sub-frame of the communication frame that indicates a structure of uplink data in the communication frame; and
storing, in the tightly coupled memory, the third subset of data.

12. The method of claim 11, wherein the second sub-frame includes an uplink sub-frame, and
 wherein the act of storing the third subset of data comprises:
 storing an uplink map (UL-MAP) in the uplink sub-frame as the third subset of data.

13. The method of claim 10, further comprising:
 determining, with the programmable controller, a structure of the communication frame based on the first subset of data; and
 communicating, from the programmable controller to the hardware processor, the determined structure of the communication frame.

14. The method of claim 10, further comprising:
 implementing, with the hardware processor, media access control (MAC) functions on data received in the communication frame; and
 implementing, with the programmable controller, MAC functions on data in the communication frame.

15. The method of claim 14, wherein the act of implementing the MAC functions with the hardware processor and the act of implementing the MAC functions with the programmable controller comprises:
 implementing the MAC functions as specified in the IEEE 802.16 Standard.

16. The method of claim 10, wherein the first sub-frame includes a downlink sub-frame, and
 wherein the act of storing the first subset of data comprises:
 storing a downlink map (DL-MAP) in the downlink sub-frame as the first subset of data.

* * * * *